United States Patent Office 3,108,149
Patented Oct. 22, 1963

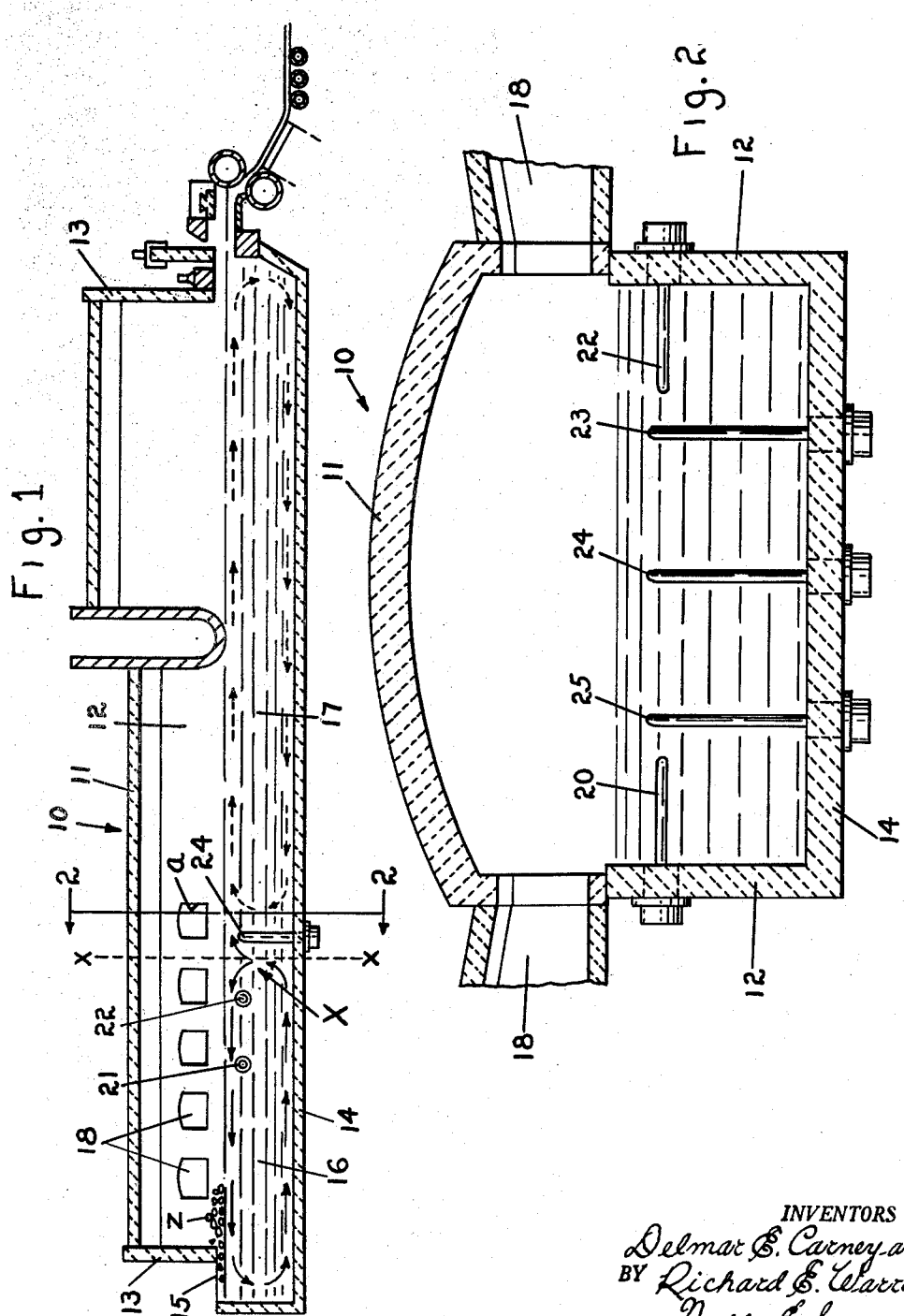

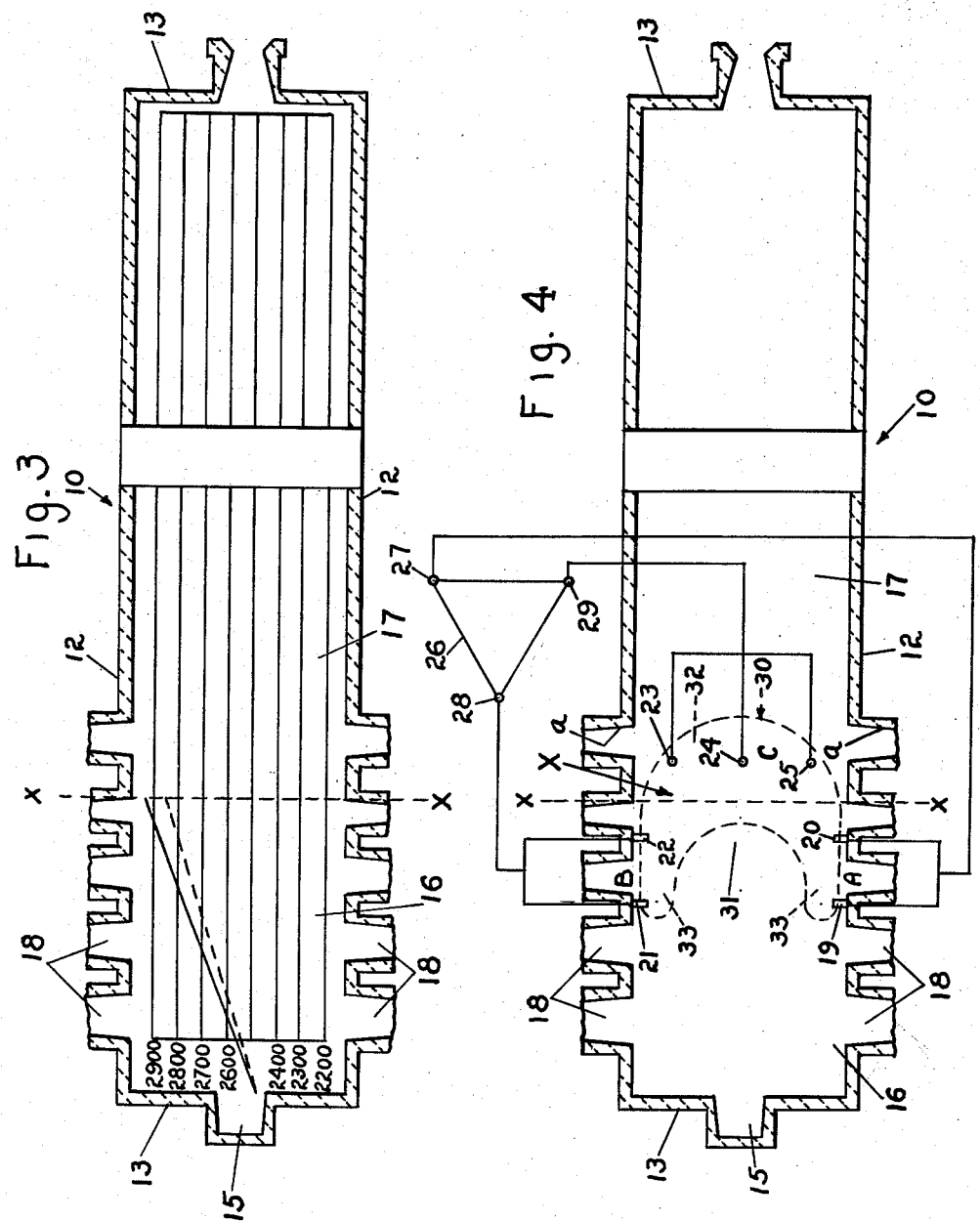

3,108,149
METHOD AND APPARATUS FOR GLASS MELTING
Delmar E. Carney and Richard E. Warren, Toledo, Ohio, assignors to Libbey-Owens-Ford Glass Company, Toledo, Ohio, a corporation of Ohio
Filed Nov. 18, 1959, Ser. No. 853,850
14 Claims. (Cl. 13—6)

The present invention relates generally to the art of glass melting, and more particularly to an improved method and apparatus for increasing the melting capacity of a glass melting furnace and for improving the quality of glass produced by such a furnace.

This is a continuation-in-part of our co-pending application Serial No. 637,412, filed January 31, 1957, now abandoned.

In the well known continuous process of glass manufacture, the raw batch material to be fused is introduced into one end of a continuous tank type melting furnace and is gradually melted and refined as it advances slowly lengthwise of the tank toward the discharge end from which it is removed in the form of molten finished glass. Fusion or melting of the batch is accomplished by heat most commonly applied in the form of flames or gases of combustion over the surface of said batch through ports which open into the melting compartment above the level of the glass. Generally speaking, four to six ports are arranged at intervals along each of the opposite sides of the conventional gas fired tank furnace.

It is of course essential in any glass manufacturing operation that the batch materials be completely melted or fused prior to issuance from the discharge or working end of the furnace. One of the most important factors in preventing the passage of unmelted or unfined material into the working end, and thereby assuring the production of a molten mass of uniform and homogeneous consistency, is accurate control of convection currents which are known to exist in the molten glass. Such currents are generally of thermal origin, and although somewhat weak in magnitude, they bear importantly on the homogeneity of the mass.

To elaborate, when the batch material is introduced into the charging or back end of the tank, the molten glass already in the melting compartment is cooled by the cold batch whereby there is established a temperature gradient which runs longitudinally of the furnace. As a result thereof, a region of maximum temperature is found to exist in the bath at substantially the location of the third port on a commercially employed five port furnace. Also, the temperature is lower at the rear or charging end of the furnace and lower at the front or discharge end than it is at the point or region at about the location of the third port. Since the glass is at its highest temperature in this area, it is expanded to its greatest extent therein and is relatively less dense than the glass in areas on either side thereof. In addition, since thermal currents flow from relatively hot areas to relatively colder areas, the glass might be said to run downhill from the relatively hotter areas where it is expanded the most, to the relatively cool areas where it is expanded the least. The relatively hot region is often referred to as a "hot spot" and may also be designated as a "spring" due to the welling up of the liquid therein.

That molten glass actually flows downhill, in other words that there is a positive circulation backward and forward in the bath from the hot spot region, can readily be demonstrated by placing pieces of silica brick on the surface of the glass. These pieces will be found to move rearwardly in the furnace if they are back of the hot spot, and will be seen to progress forwardly if they are ahead of the hot spot. In addition to this lengthwise movement, it will also be found that the silica pieces will also travel outwardly toward the sides of the tank since the glass at the sides is relatively cooler than it is at substantially the center thereof. Such phenomena clearly illustrate that thermal currents exist and that the glass in the furnace continuously travels in certain circuits. Naturally, such thermal currents and their action in causing a backward flow of surface glass from the hot spot toward the rear of the furnace are of great importance in keeping unmelted batch from travelling down the furnace to the working end.

A number of various methods have been proposed in the past for controlling and enhancing the magnitude of the convection currents. For example, greater quantities of fuel have been burned in the third port with the result that the temperature is raised in the hot spot region and the thermal currents are increased in intensity. Alternatively, relatively more fuel has been burned at the fourth port than at the other ports so that the hot spot location has been moved downwardly of the tank toward the fourth port. However, although such means have been somewhat successful, it is difficult by such means to maintain a constant position of the hot spot, and as a result, variable convection currents may be produced in the tank.

In addition to the foregoing means, furnaces have been built with partitions or weirs to mechanically segregate the so-called melting area from the refining area of the tank. While such means may be used effectively to circumscribe the thermal currents and keep them within desired bounds, it is relatively cumbersome and expensive to adapt such partitions to an existing tank. It is also possible to introduce at the bottom of the furnace high pressure gas burners carrying mixtures of fuel and air, whereby the combustible gases will pass upwardly through the glass and by their combustion will heat said glass. However, the use of such combustible gases has the disadvantages of restricting the gaseous additions to the products of combustion of the combustible gases, whereas in some instances it is desirable to avoid further additions of water vapor or other products of combustion.

Although it may be said that one or more of the above methods have helped somewhat to control the circulation of the thermal currents of molten glass, none of them were effective in increasing the melting capacity of the furnace. It is of course well known in the art that resistance heating of the molten glass in an overhead fired furnace will increase the melting capacity of the furnace since more energy is liberated as heat within the molten glass. However, it has not been recognized in the prior art that the molten glass can be resistance heated in such a fashion as to aid and control the normal thermal currents of molten glass and thus increase the melting capacity of the furnace as well as improve the quality of glass produced thereby.

Therefore an important object of the present invention is to provide a method of internally heating molten glass in a glass melting furnace and apparatus therefore which will increase the melting capacity of the furnace.

Another object of the invention is to accurately control and increase the temperature of thermal currents of molten glass in a glass melting furnace while at the same time materially increasing the melting capacity of the tank.

Another object of the invention is to increase the temperature as well as the velocity of the rearwardly flowing surface currents of molten glass which come into contact with unmelted batch materials in the furnace.

A further object of the invention is to amplify the temperature of the glass in hot spot region of the melting furnace by internally heating the glass throughout the hot spot region by means of a novel electrode arrangement.

Other objects and advantages of the invention will become more apparent during the course of the following description when taken in connection with the accompanying drawings.

In the drawings, wherein like numerals are employed to designate like parts throughout the same:

FIG. 1 is a longitudinal vertical section through a glass melting furnace having the apparatus of the invention installed therein;

FIG. 2 is an enlarged transverse sectional view taken along line 2—2 of FIG. 1;

FIG. 3 is a plan view of the furnace shown in FIG. 1 and illustrating the temperature gradient in the molten glass within the furnace; and FIG. 4 is a plan view similar to FIG. 3 and showing the flow of electric current between the various electrodes of the novel electrode arrangement of the invention.

Briefly stated, the present invention provides a method and apparatus for carrying out the method, of increasing the melting capacity of a glass melting furnace by resistance heating the uppermost strata of molten glass in a defined area thereof within the hot spot region of the molten glass.

As will later be described with reference to FIG. 4, a plurality of electrodes protrude through the side and bottom walls of the furnace and are immersed into the glass. These electrodes are connected to a multiple-phase electric current source in order to heat the glass by Joule effect currents in and immediately adjacent the hot spot region or region of upwardly rising thermal currents.

The electrode arrangement establishes a pattern of internal heat, to be later described in detail, which provides a positive thermal barrier or dam of thermal heat to bar or prevent movement of impure glass materials from the melting tank proper into the refining section of the tank. It should be here pointed out that this heat dam, augments the action of the upwardly directed thermal currents found at the hot spot so that each one acts in consort with the other. Bearing this in mind, i.e. this cooperative action between the thermal dam and the upwardly rising currents found at the hot spot, it has been found that the electrode arrangement of the present invention secures a number of important advantages over known electrode arrangements found in the prior art.

Now according to the present invention the electrodes are arranged in certain well defined groups at specific furnace locations in order to secure maximum furnace efficiency. It has been found that the number of "seeds" found in the refined glass produced in a furnace having this electrode arrangement will be reduced as compared to the number of "seeds" found in refined glass produced in the usual all-gas fired furnaces or in gas fired furnaces using the known auxiliary heating arrangements of the prior art.

It has further been found that the present electrode arrangement will, in actual commercial practice in a continuous glass furnace operation, produce surprisingly advantageous results both as to improved quality of a glass ribbon produced therefrom and as to greatly increasing the expectant capacity of the furnace.

As an example, one of the big problems in plate glass production is to increase the furnace capacity without any deterioration in the quality of the glass ribbon being produced. In fact, this deterioration of glass quality is the principal factor limiting a major increase of the productive capacity of continuous tank furnaces. However, in the very first plate glass furnace of the assignee company in which the instant electrode arrangement was employed commercially, the tonnage of the furnace was increased from 375 tons per 24 hours to 425 tons per 24 hours. Moreover, and perhaps more important, the quality of the glass ribbon produced from the tank was notably improved.

In the practice of this invention, a substantially U-shaped zone of heat is established generally within or adjacent the hot spot or region of upwardly rising thermal currents. The base portion of this U-shaped zone extends substantially transversely of the furnace with the opening facing towards the dog house or charging end of the furnace. Also, base portion of the U is normally found substantially between the melting and the fining furnace zones. Now, the primary reason for locating this U-shaped zone, as aforedescribed, is to apply its heat to assist and accelerate the natural circulation or flow of thermal currents that are formed by external heating at the furnace hot spot.

When an internally heated zone is located in a furnace region removed from the hot spot, the artificial circulation induced by this internal heating runs more or less counter to the natural circulation and thus disturbs, and in many cases counteracts, the natural circulation. The result of this is that more or less of the additional heat introduced is dissipated as energy lost by interference with natural circulation and this means an even larger amount of heat would be necessary to obtain a tonnage increase. This leads to a more significant problem in that it naturally follows that the more the natural circulation is disturbed, the more the natural fining action in the furnace is reduced. This results in a correspondingly progressively decreasing quality of glass and defeats the primary purpose of electric boosting.

Therefore the creation of the special U-shaped zone of internal heat as aforedescribed achieves important advantages in the production of high quality glass while simultaneously allowing for greatly increased furnace capacity.

With reference now to the drawings, and more particularly to FIG. 1 thereof, there is shown a continuous tank type glass melting furnace 10 in combination with which the present invention is especially suitable and adapted. It will be appreciated, however, that the novel electrode control and heating means herein disclosed may also be used in connection with materials other than glass and in melting furnaces other than of the continuous tank type.

The tank furnace 10 includes a top or roof 11, opposed side walls 12, end walls 13, and bottom or floor 14, all formed of a suitable refractory material. The glassmaking material or raw batch is introduced into the charging end 15 of the furnace by a feeder device (not shown), and is reduced to a molten state in the furnace melting zone 16 from which it flows into the refining zone 17 and is thereafter removed from the opposite or exit end of the furnace, as a homogeneous molten material. The dividing line between the melting and fining zones is indicated by the center line $x—x$ which also indicates the center line of the hot spot region X the location of which is controlled as will be later described. It will be readily understood that although the zone 16 is termed the melting zone, a portion of the fining action also takes place therein.

Heat for reducing the batch to molten glass within the melting zone 16 is provided by suitable means such as regenerators which discharge hot flames and products of combustion through ports 18 opening into the melting tank above the level of the glass flowing therein. As is common with furnaces of this type, the ports 18 are arranged at intervals along both sides of the furnace 10 and five of such ports in each side wall 12 are used in the furnace 10.

When cold raw batch Z is fed into the furnace 10 through the charging end 15 thereof, varying temperatures are established throughout the length of said furnace and the ports 18 are fired in such a manner as to maintain the centerline $x—x$ of the hot spot at substantially the location of the fourth port. In the normal five port furnace, due to thermal currents which flow forwardly and rearwardly to the relatively colder areas from the hot spot, circulation of the glass takes place in a manner whereby the completely melted materials are swept forwardly and unmelted batch is swept rearwardly and maintained within the area between about the third port and charging end until completely fused, whereupon it descends into the molten mass and is ultimately carried upwardly and thence forwardly into the refining chamber. However, it occasionally happens that the convection currents are not of sufficient magnitude to adequately circulate the molten mass with the result that unmelted batch passes beyond the third port or the hot spot and subsequently appears in the finished mass as a defect.

In accordance with the apparatus of the present invention, there is provided a novel electrode arrangement comprising a plurality of electrodes extending through the side and bottom walls of the melting furnace and positioned with respect to the hot spot so as to provide a limited area heating in the hot spot region X of the molten glass by Joule effect currents.

The novel electrode arrangement comprises opposed pairs of side wall electrode members 19 and 20, and 21 and 22 positioned ahead of the centerline $x$—$x$ of the hot spot, and three transversely aligned substantially vertical electrode members 23, 24 and 25 positioned rearwardly thereof beyond the centerline of the hot spot and extending upwardly through the bottom 14 of the melting furnace.

As shown in FIG. 4, the various electrode members are connected to a suitable source of three phase current supply shown as a polyphase transformer 26 with the side wall electrode members 19 and 20 being each connected to terminal 27 of transformer 26 to form electrode A, the opposed side wall electrode members 21 and 22 being each connected to terminal 28 of the transformer to form electrode B, and each of the vertical electrode members 23, 24 and 25 are connected to terminal 29 of the transformer 26 to form electrode C. With such a circuit arrangement, the current flow from each of the electrode members of electrode A is to each of the electrode members in electrode B and to each of the electrode members in electrode C. Similarly, the flow from each of the electrode members in electrode B is to each of the electrode members in electrode C and to each of the electrode members in electrode A, and the current flow from each of the electrode members in electrode C is to each of the individual electrode members in electrodes B and A. Thus a multiplicity of current paths are directed through the molten bath on each side of the centerline of the hot spot and extending outwardly from the transverse centerline $x$—$x$ thereof a limited distance.

Referring now to FIG. 2, the substantially vertical electrodes have the upper ends thereof positioned relatively close to the surface of the molten glass. For best operating results, it has been found that optimum melting conditions will be achieved when the upper ends of the bottom electrodes are located within about six to twelve inches of the surface of the molten glass when the total glass depth is in the order of about 48 inches. A desirable location is achieved when the distance from the tips of the lower electrodes to the surface of the glass is about eight inches. In other words, the preferred operating characteristics of the electrode system is achieved when the ratio of the submerged depth of the vertical electrodes to the depth of glass in the furnace is from about 1:4 to about 1:8 with the eight inch submergence giving a ratio of about 1:6. The side wall electrodes 19 to 22 inclusive are located at substantially the same depth with a six to twelve inch submergence in the glass having proved to be satisfactory. When submerged to such a depth, the electrodes are preferably immersed in the glass for about twenty-one to twenty-eight inches.

It will be understood by those familiar with the art that refractory stones and other contaminants are usually present in the lowermost layer of molten glass and if dislodged therefrom would be circulated through the tank and eventually come out in the sheet glass produced thereby thus forming defective glass. By maintaining the side wall electrodes and the tips of the vertical electrodes relatively high in the molten bath, it has been found that a greater temperature differential will exist between the uppermost strata of the molten glass and the bottom of the furnace and thus the lowermost portion of the glass does not become roiled and disturbed as would be the case if relatively short vertical electrodes were used.

A further and perhaps more important advantage found resulting from the present electrode arrangement is that by confining the internal heating of the glass to the area adjacent the tank hot spot and away from the end wall, a steeper slope is imparted to the portion of the temperature gradient of the molten glass running between the dog house and the hot spot. In other words, by maintaining the area of the molten bath being resistance heated spaced from the dog house, the temperature of the bath adjacent the dog house is at a lower temperature than would be the case if the glass adjacent the dog house were also resistance heated and yet the temperature of the glass in the hot spot region is increased thus giving a greater temperature rise per foot in the temperature gradient. As previously mentioned, the molten glass in the hot spot region is less dense and tends to run downhill toward the dog house and back wall of the furnace. By creating a greater differential in temperature between the glass adjacent the doghouse and the hot spot, the rearward flow of the molten glass is increased in velocity, thus making it more difficult for unmelted batch materials and foam to move forwardly along the surface of the molten bath and to find their way into the working end of the tank.

The method of the invention and the novel location of the improved electrode arrangement of the invention will be better understood and more fully appreciated when consideration is given to the flow of the thermal currents in the furnace 10. As shown in FIG. 1, the molten glass rises upwardly from the bottom of the melting tank in the region of the hot spot which hot spot is retained in a relatively constant location in the molten bath by selective firing of the tank ports 18 to maintain the centerline $x$—$x$ of the hot spot X between the opposed electrodes A and B and the electrode C.

As the molten glass is swept upwardly in the hot spot region X, a portion thereof (indicated by solid arrows) flows rearwardly along the surface of the bath and opposite to the direction of feed of the batch making material Z. As the rearwardly flowing molten glass comes into contact with the relatively cold batch material, the molten glass is cooled by imparting heat to the batch material and flows downwardly and travels along the bottom of the tank back toward the hot spot to be again swept upwardly and repeat the cycle. A certain portion of the upwardly flowing glass in the hot spot region, due to the tank "pull," moves forwardly and into the fining zone to travel toward the working end of the tank and be returned from there along the bottom of the tank to be again swept upwardly in the hot spot region and repeat its cycle.

Due to the particular location of each of the electrodes A, B and C and the manner in which the flow of current travels therebetween, the electrode arrangement not only is operated to increase the melting capacity of the tank but also to provide a thermo-dam or barrier of flowing currents of electricity which prevents unmelted batch or foam from passing beyond the hot spot region and being carried downwardly into the working end of the tank.

The melting capacity of the tank is increased by resistance heating the rearwardly flowing molten glass from the time it reaches the uppermost strata of molten glass, adjacent the center line $x$—$x$ of the hot spot X in which strata it is most effectively heated by the flames from the ports 18, until the molten glass has flowed rearwardly beyond the electrodes A and B. As a result of being internally heated, the rearwardly flowing molten glass is at a higher temperature than would ordinarily be the case and is able to impart more heat to the unmelted batch material Z thus making it possible to melt more batch material in a given time interval which, of course, increases the tank production.

Since the shortest path from electrode group A to electrode group B is a straight line, the value of the current flow from these electrode groups to one another is greatest between the electrode members 19 and 21 of electrodes A and B respectively, and between the electrode members 20 and 22 of electrodes A and B respectively. Also, a current flow of less magnitude traverses the molten glass between electrode members 19 and 22, and between electrode members 20 and 21. Thus the primary current flow of greatest magnitude is between the side walls of the tank at substantially right angles to the path of flow of the molten glass in the melting tank and provides, in combination with the flow of currents between the other electrodes, an effective thermal barrier localized in the upper strata of molten glass which prevents the passage of unmelted batch material or foam into the fining zone of the tank.

Since the electrode C is in the fining zone, the molten glass traveling along the bottom of the tank in the fining zone and toward the hot spot region is internally heated after it has been drawn upwardly in the hot spot region and as it moves toward the working end of the tank along the surface of the molten bath prior to passing beyond the electrode C.

It was previously mentioned that a portion of the molten glass from the melting zone flows upwardly in the hot spot region and passes into the fining zone adjacent the surface of the molten glass therein and mingles with the upwardly directed glass from the fining zone. This co-mingling of the two streams of molten glass take place between the vertical electrode C and the centerline $x$—$x$ of the hot spot and thus the co-mingled streams are internally heated to a substantially uniform temperature which enables them to more readily mix.

It was also previously mentioned that one of the advantages of the invention is due to the fact that the slope of the thermal gradient between the end wall of the tank adjacent the dog house and the hot spot was increased due to the fact that the area heating of the glass was concentrated in the hot spot region and thus the temperature of this region is increased which in turn increases the velocity of the rearwardly flowing glass.

Referring now to FIG. 3, there is shown a portion of the straight line temperature gradient within the molten glass in a melting furnace embodying the present invention. The dotted lines indicate the temperature gradient in the molten glass from the back wall of the furnace to approximately the centerline $x$—$x$ of the hot spot X when the electrode arrangement is not operated, and the solid line indicates the temperature gradient for the same region of the glass when the electrode arrangement is energized and the molten glass in the hot spot region is being resistance heated. For purposes of illustration, since only a comparison of back wall and hot spot temperatures are necessary, the temperature gradients have been shown as straight lines. However, in most furnaces the true curve of the temperature gradient would be convex in shape.

It will be noted that there is substantially no change in the temperature of the molten glass adjacent the back wall when the electrodes are not used, and when they are energized and in each case the temperature of the glass is about 2500° F. However, there is a marked difference between the temperature in the hot spot region when the electrodes are energized as compared to when the power is off. With the power on, the temperature at about the centerline of the hot spot is approximately 2930° F., whereas when the power is off the temperature at about the centerline of the hot spot is approximately 2860° F. or 70° less. It will be readily appreciated by those familiar with the art that a 70° temperature rise will materially increase the melting capacity of the furnace and, in fact, the electrode arrangement of the present invention is capable of maintaining a temperature differential of about 70° F. regardless of the amount of batch material fed into the furnace.

In a melting furnace operated in accordance with the invention, the centerline $x$—$x$ of the hot spot was approximately 37 feet from the end wall adjacent the dog house, and the above mentioned temperatures were obtained by taking optical pyrometer readings of the tank side walls immediately above the molten glass. The temperature readings, when considering the distance from the centerline of the hot spot $x$—$x$ to the end wall, result in a temperature rise of approximately 9.7° F. per foot with power off as compared to 11.6° F. per foot with the power on, and in each instance, both with power on and power off, the tank was considered to be operated at optimum efficiency. Thus, as a result of the present invention an increase in the slope of the temperature gradient of approximately 1.9° F. per foot was obtained in the melting zone of the furnace where, of course, an increase in temperature of the molten glass is most significant since a temperature increase of the molten bath obviously results in increased melting capacity of the tank. At the same time, the glass is considerably hotter in the hot spot region of the molten bath and, in effect, more expanded as compared to the region of the bath adjacent the tank end wall. Therefore, the "downhill" rearwardly flow of the molten glass is increased when the temperature in the hot spot region is increased since the temperature of the molten glass adjacent the tank end wall remains relatively constant. As previously mentioned, an increase in the velocity of the rearwardly flowing glass makes it more difficult for unmelted batch making material or foam to pass the hot spot region and find their way into the working end of the tank.

In the foregoing description there is described the novel arrangement of electrode groups A, B and C which arrangement will provide a U-shaped zone of internal heat at the furnace hot spot. In this electrode arrangement a pair of electrodes 19 and 20 protrude into the molten glass from one side wall and a second pair of electrodes 21 and 22 protrude into the glass from the opposite side wall. Both pairs of electrodes are disposed at the upstream side of the natural hot spot in the glass, flowing through the furnace from the charging end of the refining chamber. These electrodes 19 through 22 are therefore found at the charging end side of the hot spot region when examined with regard to the longitudinal centerline $x$—$x$ of this region. In addition three other electrodes 23, 24 and 25 are positioned beyond the longitudinal centerline $x$—$x$ of this hot spot region and located on the side of the hot spot region farthest removed from the charging end of the furnace. These latter electrodes 23, 24 and 25 extend upwardly through the bottom wall of the furnace and are disposed along a line substantially parallel to the longitudinal centerline $x$—$x$ of the hot spot region.

Three phase electrical power is supplied to the electrodes as follows: one phase in common to each of the floor electrodes 23, 24 and 25; a second phase to one pair 19, 20 of the side wall electrodes; and the third phase to the remaining pair 21, 22 of side wall electrodes. The primary heating or Joule effect currents are passed through the glass in the tank between electrodes 21—23, 22—23, 22—24, 24—20, 25—20 and 25—19. It is therefore noted that a major portion of the Joule effect currents pass across and through the hot spot region.

When viewed downwardly into the tank as in FIG. 4, a U-shaped pattern or zone 30 of heat is produced. The open end 31 of zone 30 is facing toward the charging or dog house end of the tank and the base 32 of the U is disposed substantially transverse to the flow line of molten glass in the furnace. Thus the base portion 32 of the U-shaped zone 30 extends between the side walls 12 of the furnace while the opposite legs 33 of the U-shaped zone 30 pass substantially along the opposite side walls 12 of the furnace.

Although it might be inferred from the detailed description of the pattern heating of the glass above discussed, that the heating currents would result in a pattern of substantially uniform heating intensity between all of the electrodes. However, in fact in actuality a different situation exists. First of all, due to the relatively small resistance between electrodes of opposite polarity which are closer to one another, the primary or high heating current paths are as noted above, but secondary heating currents are established between electrodes 19—21 and 20—22. Thus a minor portion of the heating currents pass along a line parallel to the longitudinal center line x—x of the hot spot region between the last-mentioned side wall electrodes and on the charging end side of the hot spot region. Secondly, due to the presence on the immersed surface of an electrode of a relatively high resistance coating, greater heating takes place immediately adjacent the electrodes than along the current path through the glass between the electrodes. In other words, rather than having a substantially linear or uniform intensity pattern of heating over the entire area of the hot spot region along the lines of current flow within the glass, there exists a plurality of localized high heat intensity regions in the glass immediately adjacent each electrode forming U-shaped pattern 30. It is understood, however, that these regions are joined as above discussed by moderate areas of heat along the lines of the Joule effect currents.

Establishing the heat barrier or dam as a plurality of relatively high local areas of heating in the form of an open U, rather than a single area barrier of uniform heating over a large area, has the beneficial effect of enhancing the welling upward of the glass in this hot spot region and accelerating the rearward flow of the surface currents therefrom. This is believed to be highly important in removing or reducing "seed" content in the glass and particularly when it is necessary to boost the furnace capacity.

Although the reason therefor is not fully understood, it has been found that optimum results are obtained when the area of the molten glass being resistance heated is a certain proportion of the area of the molten glass subjected to flames from the ports 18, or differently stated, to the firing area of the furnace. In the above mentioned installation wherein the invention has been successfully employed, the over all area of the molten bath subjected to flames from the ports 18 (i.e., the distance between the furnace back wall and the far wall a of the endmost port 18 multiplied by the furnace width) was approximately 1344 square feet, and the area thereof subjected to resistance heating (i.e., the area of a polygon formed by connecting the tips of the vertical electrodes and the bases of the side-wall electrodes and which is within the area subjected to flames) was about 435 square feet. In other words, the ratio of the area of the glass being resistance heated to the area being both resistance and flame heated is approximately 1:3.

In addition to the foregoing ratio of bath areas, it has been found that the particular geometric arrangement of electrodes shown and the particular manner in which current is flowed through the bath materially effects the over all performance of the furnace although, again, the exact reasons therefore are not fully understood. However, many different electrode arrangements were tried and the "pyramid type" arrangement shown in the drawings gave greatly improved results as compared to any of the others. This is believed to be due to the fact that the heaviest concentration of current paths is immediately adjacent the centerline of the hot spot and at an angle with respect to the transverse centerline x—x thereof. In this connection, preferred results are obtained when the spacing between each of the members of electrode C is about one third of the furnace width, while at the same time the electrode arrangement provides a plurality of current paths spaced from the centerline of the hot spot toward the tank end wall which, as previously mentioned, creates an advanced thermo-barrier which prevents or hinders the flow of batch material or foam thereby.

Although the furnace 10 shown in the drawings is of the type commonly used for manufacturing plate glass, the present invention may be used in window glass type furnaces as well as the smaller furnaces commonly used in the glass container industry which in many cases incorporate burners in the end walls thereof. Also, the invention is adapted to be used with all electric furnaces in which electrodes are used to supply the basic heating of the molten bath and the present invention may be used to increase the melting capacity of such furnaces.

It is to be further understood that the form of the invention herewith shown and described is to be taken as a preferred embodiment of the same, but that various changes may be resorted to without departing from the spirit of the invention or the scope of the subjoined claims.

We claim:

1. A method of heating molten glass flowing through a glass melting furnace from the charging end thereof through a melting zone and into a refining zone, the steps of directing heat onto the surface of the glass to create a hot spot with a region of upwardly rising thermal currents, and simultaneously passing Joule effect currents through the glass at said hot spot and region of upwardly raising thermal currents in a substantially U-shaped pattern with the open end of said U-shaped zone being directed towards the charging end of the furnace.

2. A method of increasing the melting capacity of a glass melting furnace, the steps of inducing a region of upwardly rising thermal currents in the molten glass by external heating, and resistance heating the uppermost strata of molten glass in said region to form in said region a U-shaped thermal barrier to prevent unmelted batch materials from passing through the zone of upwardly rising thermal currents.

3. A method of increasing the melting capacity of a glass melting furnace the steps of externally heating the glass to form a region of upwardly rising thermal currents passing Joule effect currents entirely through the region of upwardly rising thermal currents from sources positioned on opposite sides of the transverse centerline of said region and confining the resistance heating to the uppermost strata of the molten glass in said region.

4. A method of increasing the melting capacity of a tank type glass melting furnace in which molten glass flows from the batch feeding end thereof through the melting zone thereof and into the refining zone, the steps of heating the glass externally to produce a transverse region of upwardly rising thermal currents of glass in the area between the melting and fining zones, resistance heating the portion of these upwardly rising currents which flow rearwardly from the region of upwardly rising thermal currents and towards the batch feeding end of the furnace, and confining the internal resistance heating of the rearward flowing glass currents to the glass immediately adjacent the side walls of the furnace.

5. A method of heating molten glass flowing through a glass melting furnace from the charging end thereof, through a melting zone and into a refining zone to increase the melting capacity of the furnace, the steps of directing heat onto the upper surface of the glass to create a transverse region of upwardly rising thermal currents, and further heating the glass by Joule effect currents passing through the glass between electrodes immersed into the glass in the region of upwardly rising thermal currents and divided into at least three groups, two of said groups being positioned along the opposite sides of said furnace and opposite each other and the other group extending between opposite sides of said furnace transversely of said furnace and farther from the charging end of the furnace than said first-mentioned two electrode groups.

6. A method of heating molten glass flowing through a glass melting furnace from the charging end thereof, through a melting zone and into a refining zone to increase the melting capacity of the furnace, the steps of directing heat onto the upper surface of the glass to create a transverse region of upwardly rising thermal currents, further heating the glass by Joule effect currents passing through the glass between electrodes immersed into the glass in the region of upwardly rising thermal currents and divided into at least three groups, two of said groups being positioned along the opposite sides of said furnace and opposite each other, the other group extending between opposite sides of said furnace transversely of said furnace and farther from the charging end of the furnace than said first-mentioned two electrode groups and connecting said electrodes to a current source to pass Joule effect currents through the glass to establish a substantially U-shaped zone of resistance heating in the glass, the open end of said U-shaped zone being directed towards the charging end of the furnace.

7. A method of increasing the melting capacity of a glass tank melting furnace in which molten glass flows from the charging end thereof through a melting zone and into a refining zone and in which external heat is applied in order to form a substantially transverse region of upwardly rising thermal currents, the steps of internally resistance heating the molten glass to accelerate the velocity of the rearwardly flowing surface currents of molten glass emanating from the region of upwardly rising thermal currents and confining the internal resistance heating to the area of glass immediately adjacent to the region of the upwardly rising thermal currents.

8. A method of increasing the melting capacity of a glass tank melting furnace in which molten glass flows from the charging end thereof through a melting zone and into a refining zone and in which external heat is applied in order to form a substantially transverse region of upwardly rising thermal currents, including the step of amplifying the externally induced temperature of the glass in the region of the upwardly rising thermal currents by internal heating of the glass and concentrating the application of the internal heat in the upper one-quarter of the depth of the bath in the region of upwardly rising thermal currents to accelerate the velocity of the rearwardly flowing surface currents of the molten glass originating from the said region of upwardly rising thermal currents.

9. In a method of treating molten glass flowing through a continuous tank type melting furnace in which the glass is externally heated to create a region of upwardly rising thermal currents said region extending transversely of a furnace and being located at a point intermediate the ends of the furnace and electrodes are immersed in the molten glass at opposite sides of the longitudinal centerline of the region of upwardly rising thermal currents, the steps of passing Joule effect currents between the electrodes and through said region of upwardly rising thermal currents from one side of said region to the other side of said region and passing other Joule effect currents between the electrodes found exclusively on one side of the region of upwardly rising thermal currents so that said last-mentioned Joule effect currents pass through the glass along a line substantially parallel to the longitudinal centerline of the region of upwardly rising thermal currents.

10. A method as defined in claim 14, in which the vertical electrodes in said furnace are positioned at the downstream side of said transversely extending area, the horizontal electrodes are positioned at the upstream side of said transverse area, and said Joule effect currents flow across said hot spot from said vertical to said horizontal electrodes.

11. A method as defined in claim 14, in which the vertical electrodes in said furnace are positioned at the downstream side of said transverse area, one set of horizontal electrodes is positioned at the upstream side of said transverse area, a second set of horizontal electrodes is positioned upstream from said first set of horizontal electrodes, and said Joule effect currents flow across said hot spot between said vertical and said horizontal electrodes and substantially parallel with said hot spot between said horizontal electrodes.

12. A method as defined in claim 14, in which all of said electrodes in said furnace extend into the upper one-quarter of the depth of the molten glass.

13. A glass melting furnace having side, bottom and end walls to define a channel along which is directed a stream of molten glass, including external combustion heating means to heat the glass and to produce therein a transverse region of upwardly rising thermal currents of glass at a point substantially intermediate the length of the furnace, a plurality of first electrode members arranged in opposed pairs and positioned adjacent the opposite side walls of the furnace in the region of upwardly rising thermal currents on the batch feeding side thereof and a plurality of second electrode members arranged substantially transverse to the path of glass in the region of upwardly rising thermal currents on the side of the region farthest removed from the batch feeding end of the furnace.

14. The method of treating molten glass flowing through a continuous tank type furnace in which there is positioned a combination of vertical electrodes extending upwardly through the bottom of the furnace into the molten glass with horizontal electrodes extending laterally through the side walls of the furnace at opposite sides of a transversely extending area in said furnace, which comprises firing said furnace to heat said glass from above and create a natural hot spot at said transversely extending area in said furnace by combustion heat, and supplying multiple phase electric current to said electrodes to heat the glass in and immediately adjacent said hot spot by Joule effect currents.

References Cited in the file of this patent

UNITED STATES PATENTS

| | | |
|---|---|---|
| 1,944,855 | Wadman | Jan. 23, 1934 |
| 2,081,595 | McIntosh | May 25, 1937 |
| 2,225,616 | Borel | Dec. 24, 1940 |
| 2,254,079 | McAlpine | Aug. 26, 1941 |
| 2,267,537 | Romazzotti | Dec. 23, 1941 |
| 2,512,761 | Arbeit | June 27, 1950 |
| 2,545,619 | Lambert | Mar. 20, 1951 |
| 2,600,490 | De Voe | June 17, 1952 |
| 2,636,914 | Arbeit | Apr. 28, 1953 |
| 2,658,095 | Arbeit et al. | Nov. 3, 1953 |
| 2,749,378 | Penberthy | June 5, 1956 |
| 2,767,235 | Herrold et al. | Oct. 16, 1956 |

FOREIGN PATENTS

| | | |
|---|---|---|
| 1,000,540 | France | Oct. 17, 1951 |